US012654503B2

(12) United States Patent
Jeong et al.

(10) Patent No.: US 12,654,503 B2
(45) Date of Patent: Jun. 16, 2026

(54) SLEEVE FOR AIR SPRING FOR VEHICLE AND AIR SPRING INCLUDING THE SAME

(71) Applicant: ILJIN Co., Ltd., Gyeongju-si (KR)

(72) Inventors: Sewoong Jeong, Ulsan (KR);
Jonghyung Seo, Seoul (KR);
Byunghwan Kim, Ulsan (KR);
Sangwoo Kim, Gyeongsangnam-do
(KR)

(73) Assignee: ILJIN Co., Ltd., Gyeongju-si (KR)

( * ) Notice: Subject to any disclaimer, the term of this patent is extended or adjusted under 35 U.S.C. 154(b) by 0 days.

(21) Appl. No.: 18/677,038

(22) Filed: May 29, 2024

(65) Prior Publication Data

US 2024/0399808 A1     Dec. 5, 2024

(30) Foreign Application Priority Data

Jun. 5, 2023     (KR) ........................ 10-2023-0072341
Sep. 27, 2023    (KR) ........................ 10-2023-0131038

(51) Int. Cl.
*B60G 11/28*        (2006.01)
*B60G 11/27*        (2006.01)
(52) U.S. Cl.
CPC .............. *B60G 11/28* (2013.01); *B60G 11/27*
(2013.01); *B60G 2202/152* (2013.01)
(58) Field of Classification Search
CPC .... B60G 11/28; B60G 11/27; B60G 2202/152
See application file for complete search history.

(56) References Cited

U.S. PATENT DOCUMENTS

| | | | |
|---|---|---|---|
| 3,727,899 A | 4/1973 | Pemberton | |
| 4,807,858 A * | 2/1989 | Watanabe ................. | F16F 9/04 |
| | | | 267/64.19 |
| 5,975,506 A | 11/1999 | Thurow | |
| 8,066,265 B2 | 11/2011 | Leonard | |
| 9,127,737 B2 * | 9/2015 | Leonard ................. | B60G 11/27 |
| 2014/0027962 A1 * | 1/2014 | Behmenburg ........ | F16F 9/0409 |
| | | | 267/64.27 |
| 2023/0056137 A1 | 2/2023 | Coulthard et al. | |

FOREIGN PATENT DOCUMENTS

| | | | |
|---|---|---|---|
| EP | 2090801 B1 | 1/2009 | |
| EP | 2090801 A1 * | 8/2009 | ........... F16F 9/0463 |
| EP | 2351946 A2 | 8/2011 | |
| FR | 2717237 A1 * | 9/1995 | ........... F16F 9/0409 |
| JP | S62292939 A | 12/1987 | |
| JP | 2003202045 A | 7/2003 | |
| JP | 2003307248 A | 10/2003 | |

OTHER PUBLICATIONS

EP-2090801-A1 Machine English translation (Year: 2009).*
FR-2717237-A1 Machine English Translation (Year: 1995).*

* cited by examiner

*Primary Examiner* — Jason D Shanske
*Assistant Examiner* — Matthew James O'Neill
(74) *Attorney, Agent, or Firm* — Dinsmore & Shohl LLP;
Yongsok Choi, Esq.

(57)        ABSTRACT

A sleeve for an air spring for a vehicle includes at least an upper sleeve and a lower sleeve. An upper circumferential portion of the upper sleeve is coupled to a top mount, a lower circumferential portion of the lower sleeve is coupled to a piston portion, and one of the upper sleeve and the lower sleeve is formed to have different thicknesses for each section along a longitudinal direction.

13 Claims, 7 Drawing Sheets

500

520

540

600

SLEEVE FOR AIR SPRING FOR VEHICLE AND AIR SPRING INCLUDING THE SAME

CROSS-REFERENCE TO RELATED APPLICATIONS

This application claims priority to Korean Patent Application No. 10-2023-0072341 filed on Jun. 5, 2023 and Korean Patent Application No. 10-2023-0131038 filed on Sep. 27, 2023, the entire contents of which are herein incorporated by reference.

TECHNICAL FIELD

The present disclosure relates to a sleeve for an air spring for a vehicle and the air spring for a vehicle including the same, and more specifically, to a sleeve for an air spring for a vehicle which has improved the property and rigidity of the air spring without a complex reinforcing fiber process, and the air spring for a vehicle including the same.

BACKGROUND

A suspension for a vehicle is provided between a vehicle body and a wheel to connect the vehicle body and the wheel as rigid bodies by one or multiple links. The suspension is supported by a spring, a shock absorber and the like in a vertical direction, and serves to appropriately balance a mechanical relative movement between the vehicle body and the wheel by appropriately combining high rigidity and flexibility in other directions.

The suspension needs to satisfy the following basic conditions. That is, the suspension needs to effectively block irregular inputs generated from a road surface when the vehicle is travelling, thus providing a comfortable ride quality to passengers. The suspension needs to provide driving convenience by appropriately control the shaking of the vehicle body caused by a driving behavior of a driver and unevenness of the road surface. Further, when the vehicle travels on the unevenness road surface, the suspension needs to maintain a vertical load acting on each tire at a contact surface with the unevenness road surface at an appropriate level, thus ensuring the driving operation and stability of the vehicle during turning and braking.

In order to satisfy such conditions, various types of suspensions have been developed and applied to vehicles. In recent years, an air suspension has been widely applied to a deluxe vehicle. The air suspension improves the ride quality by changing a constant of an air spring to change a volume of a sleeve constituting the air spring, and automatically maintains a height of the vehicle by changing an amount of air.

Such a sleeve is repeatedly deformed. Accordingly, the sleeve needs to have excellent durability. However, a sleeve in the related art needs to have improved durability. For example, a rubber sleeve in the related art is manufactured by a complex reinforcing fiber process to improve durability and reinforce rigidity. This may entail significant deterioration in manufacturing efficiency of the sleeve.

DOCUMENT IN RELATED ART

Patent Document (Patent Document 0001) European Patent No. 2,090,801 (Jan. 26, 2009)

SUMMARY

The present disclosure was made to solve the above-mentioned matters, and the present disclosure is for the purpose of providing a sleeve for an air spring for a vehicle which has improved spring property and rigidity without a complex reinforcing fiber process, and the air spring for a vehicle including the same.

Further, the present disclosure is for the purpose of providing a sleeve for an air spring for a vehicle in which stress of a material may be easily managed by controlling an expansion rate of the sleeve, and the air spring for a vehicle including the same.

Further, the present disclosure is for the purpose of providing a sleeve for an air spring for a vehicle in which product performance may be improved by enhancing a degree of freedom in design, and the air spring for a vehicle including the same.

Further, the present disclosure is for the purpose of providing a sleeve for an air spring for a vehicle in which the sleeve may be manufactured to be divided into a plurality of sleeves by injection molding to improve a flow of the injection molding of each sleeve and improve a quality of each sleeve, and the air spring for a vehicle including the same.

According to an example embodiment of the present disclosure, a sleeve 500 for an air spring for a vehicle, may include at least an upper sleeve 520 and a lower sleeve (540, 640), in which an upper circumferential portion 522 of the upper sleeve 520 may be coupled to a top mount, a lower circumferential portion (544, 644) of the lower sleeve (540, 640) may be coupled to a piston portion, and one of the upper sleeve 520 and the lower sleeve (540, 640) may be formed to have different thicknesses for each section along a longitudinal direction.

As an aspect, a thickness of the sleeve in a region where a rolling lobe is formed when the piston portion is raised at a maximum may be greater than a thickness of the sleeve in the region where the rolling lobe is formed when the piston portion is lowered at a maximum.

As an aspect, the thickness of the sleeve in the region where the rolling lobe is formed when the piston portion is raised at a maximum may be greater than a thickness of the sleeve in the region where the rolling lobe is formed when the vehicle is stopped in a drivable state.

As an aspect, the lower circumferential portion 524 of the upper sleeve 520 and the upper circumferential portion 542 of the lower sleeve 540 may be arranged to overlap each other, and in the overlapping region where the lower circumferential portion 524 of the upper sleeve 520 and the upper circumferential portion 542 of the lower sleeve 540 are arranged to overlap each other, a thickness of the upper sleeve 520 and a thickness of the lower sleeve 540 may be substantially identical to each other, or the sleeve arranged inwardly in the overlapping region may be greater than a thickness of the sleeve arranged outwardly in the overlapping region.

As an aspect, the one of the upper sleeve 520 and the lower sleeve (540, 640) formed to have the different thicknesses for each section may be configured to have at least a first section in which an inner diameter is constant in the longitudinal direction and a second section in which the inner diameter decreases constantly downward in the longitudinal direction. An inner-diameter transition section may be provided between the first section and the second section to connect the first section and the second section.

As an aspect, the sleeve may be formed to have the different thicknesses such that, when the piston portion is raised at the maximum, the sleeve has a maximum thickness in the region where the rolling lobe is formed.

As an aspect, the sleeve may be formed to have the different thicknesses such that, when the vehicle is stopped in a drivable state, the sleeve has a minimum thickness in the region where the rolling lobe is formed.

As an aspect, the sleeve may be formed to have the different thicknesses such that, when the piston portion is lowered at the maximum, the sleeve has a minimum thickness in the region where the rolling lobe is formed.

As an aspect, the maximum thickness may be in a range of 3.0 to 7.0 millimeter (mm). The minimum thickness may be in a range of 1.0 to 4.0 mm.

As an aspect, the sleeve formed to have the different thicknesses may be the lower sleeve (540, 640).

According to another example embodiment of the present disclosure, an air spring for a vehicle may include: the sleeve (500, 600) configured as above; a top mount mounted on an upper circumferential portion (522, 622) of an upper sleeve (520, 620); and a piston portion mounted on a lower circumferential portion (544, 644) of a lower sleeve (540, 640).

According to an example embodiment of the present disclosure, a sleeve for an air spring for a vehicle is configured to have different thicknesses for each section in a longitudinal direction, which makes it possible to improve the property and rigidity of the air spring without a complex reinforcing fiber process.

Further, according to an example embodiment of the present disclosure, by manufacturing a sleeve to be divided into a plurality of sleeves by injection molding, it is possible to improve a flow of the injection molding of each sleeve, improve a quality of each sleeve, enhance a degree of freedom in design and improve product performance.

DETAILED DESCRIPTION

Figure 1:
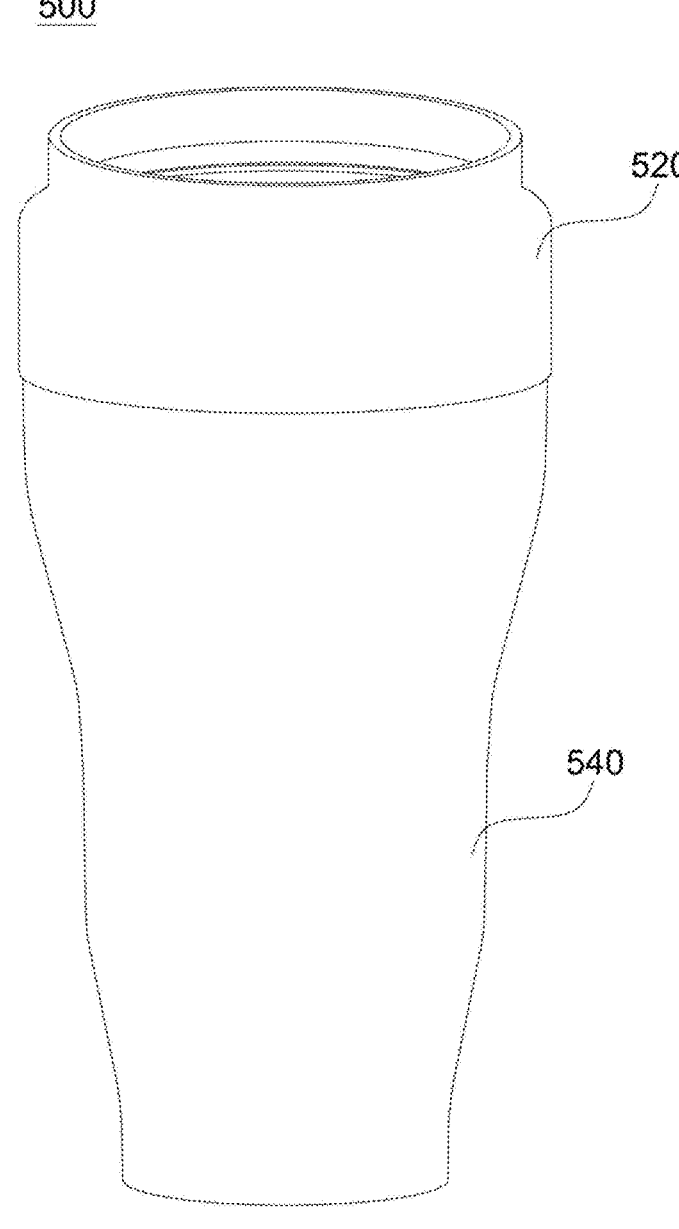
FIG. 1 is a perspective view of a sleeve according to an example embodiment of the present disclosure.

Various modifications may be added to example embodiments of the present disclosure. Specific example embodiments will be described with reference to the drawings. However, the present disclosure is not limited to the specific example embodiments but should be understood as including various modifications, equivalents or alterations, which fall within the scope and the technical sprit of the present disclosure. In descriptions of the drawings, like reference numerals will refer to the same or similar constituent elements. Further, although the terms such as a "first," a "second," "A," and the like used herein may be used to explain various constituent elements, such constituent elements should not be limited by such terms. The above terms may be used to distinguish a constituent element from another constituent element. For example, a first constituent element may be named as a second constituent element in another description of the specification without departing from the scope of the present disclosure. Conversely, the second constituent element may be named as the first constituent element in another description of the specification. The term "and/or" may be used to represent a combination of a plurality of related items described herein or at least one of the plurality of related items. Further, when a constituent element is referred to as being "coupled" or "connected" to another constituent element, the constituent element may be directly coupled or directly connected to the another constituent element, but yet another constituent element may be provided between the constituent element and the another constituent element. Further, when a constituent element is referred to as being "directly coupled" or "directly connected" to another constituent element, yet another constituent element may not be provided between the constituent element and the another constituent element.

The terms used herein are merely used to describe specific example embodiments and do not limit the present disclosure. Expressions in the singular form should be understood to encompass expressions in the plural form unless the context clearly indicates otherwise. The term "includes," "has" or the like are intended to include features, numeric characters, operations, operations, constituent elements, parts, or a combination thereof, and should be understood not to exclude one or more other features, numeric characters, operations, operations, constituent elements, parts, or a combination thereof, or additional features and the like. Terms a "first," a "second," and the like are used to distinguish a plurality of constituent elements from each other, and the order or importance of corresponding constituent elements is not limited by these terms. Unless otherwise defined, all technical and scientific terms used herein have the same meaning commonly understood by those skilled in the art to which the present disclosure pertains. In addition, the commonly-used predefined terms should be interpreted as consistent with the meanings of the context in the related art and should not be interpreted as having ideal or excessive formal meanings unless otherwise defined in this application. Further, the term "about" used herein should be understood to include a manufacturing tolerance range in the technical field to which the present disclosure pertains.

When one constituent element "comprise or includes" another constituent element through the specification and the claims, this means that the one constituent element may further include other constituent elements, rather than excluding other constituent elements, unless other stated. Hereinafter, preferred example embodiments of the present disclosure will be described in detail with reference to the accompanying drawings.

An air spring may be arranged between a top mount and a piston portion to act as a spring. For example, the air spring may include a housing and a sleeve.

According to an example embodiment of the present disclosure, one end of the sleeve may be hermetically fixed to the top mount and the other end thereof is hermetically fixed to the piston portion. The sleeve may be enclosed by the housing.

As an example, the sleeve is an air bag whose volume may vary with up and down movement of the piston portion. That is, the volume of the sleeve, which has a constant internal pressure, varies with the up and down movement. With the variation in the internal pressure, the sleeve acts as the spring.

According to an example embodiment of the present disclosure, one end of the sleeve may be hermetically fixed to the top mount and the other end thereof may be hermetically fixed to an inner surface of the piston portion. The sleeve may be enclosed by the housing. When the piston portion is moved upward relative to the sleeve in an axial direction, a bent portion of the sleeve, that is, a portion where a rolling lobe is formed, may be rolled together with the piston portion to be formed in a round shape. Accordingly, air inside the sleeve is compressed so that the sleeve acts as an air spring.

Figure 2:
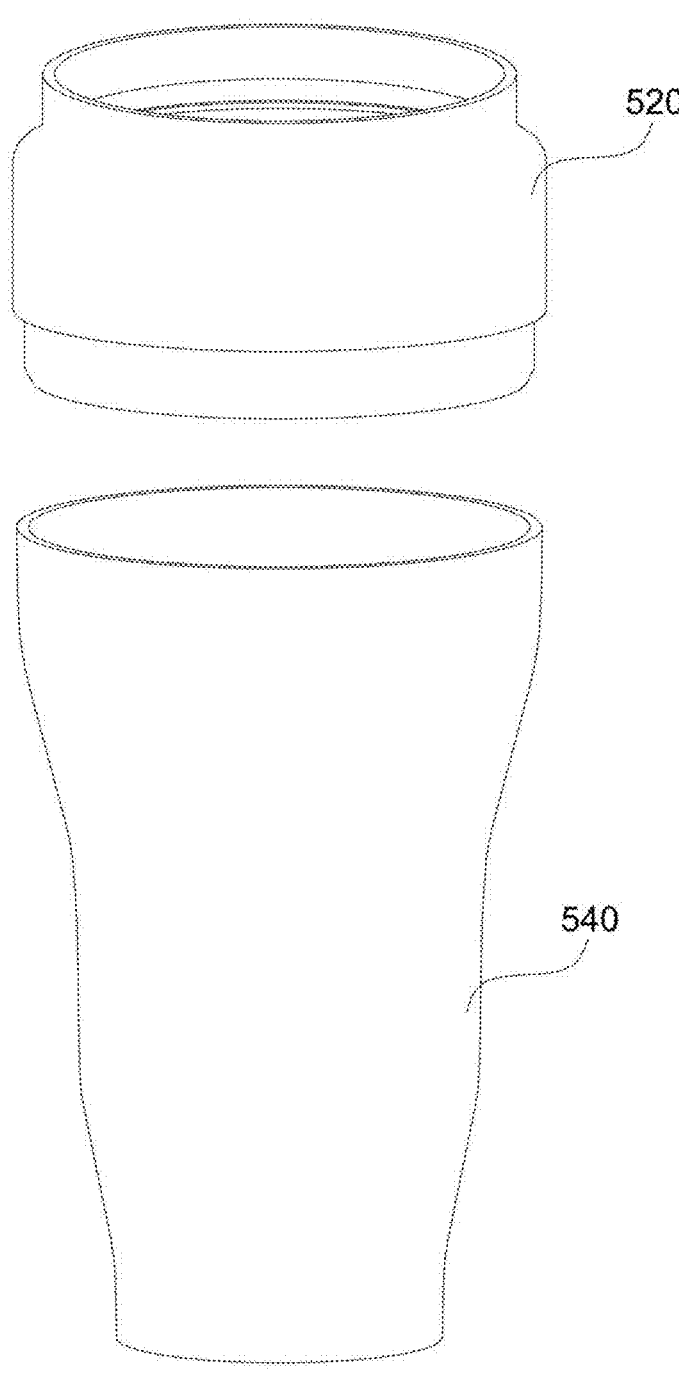
FIG. 2 is an exploded perspective view of the sleeve illustrated in FIG. 1.
Figure 3:
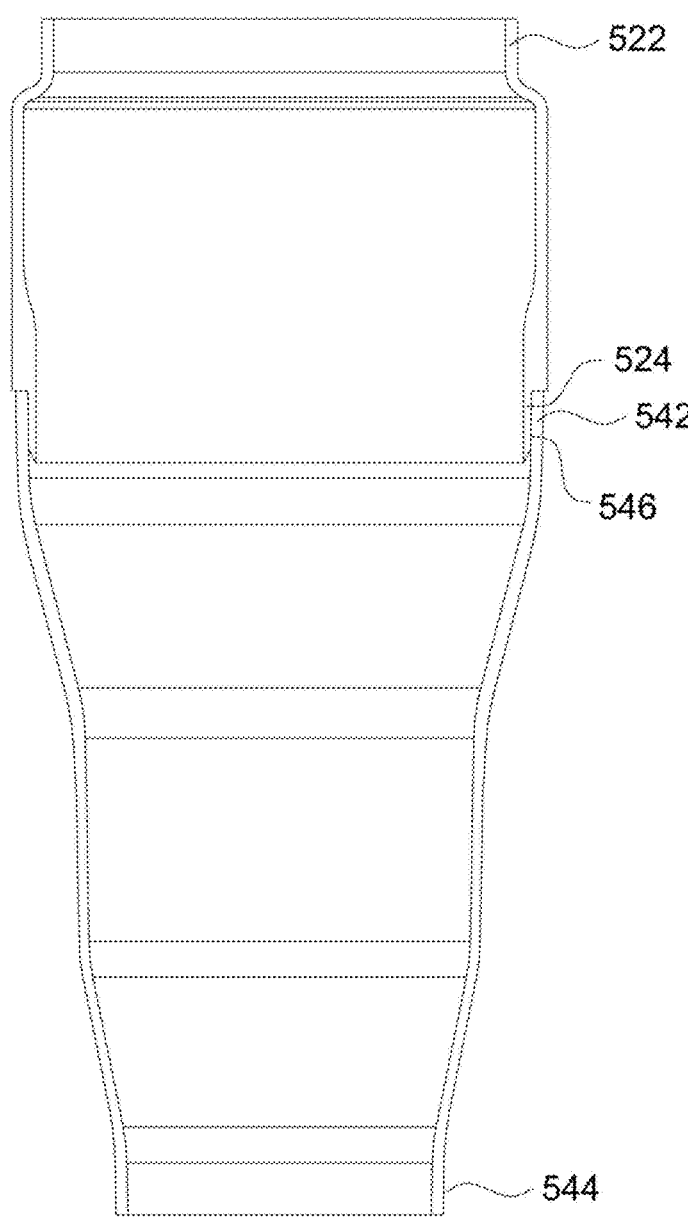
FIG. 3 is a cross-sectional view of the sleeve illustrated in FIG. 1.

FIG. 1 is a perspective view of a sleeve according to an example embodiment of the present disclosure. The sleeve illustrated in FIG. 1 is a sleeve before being mounted to a top mount and a piston portion to form a lobe. FIG. 2 is an exploded perspective view of the sleeve illustrated in FIG. 1. FIG. 3 is a cross-sectional view of the sleeve illustrated in FIG. 1.

As illustrated in FIGS. 1 to 3, for example, a sleeve 500 for an air spring for a vehicle according to an example embodiment of the present disclosure may be entirely formed in a cylindrical shape. The sleeve 500 may include at least an upper sleeve 520 and a lower sleeve 540. An upper circumferential portion 522 of the upper sleeve 520 may be coupled to the top mount and a lower circumferential portion 524 of the upper sleeve 520 may be coupled to an upper circumferential portion 542 of the lower sleeve 540. A lower circumferential portion 544 of the lower sleeve 540 is coupled to the piston portion.

In FIG. 1, the lower sleeve 540 out of the upper sleeve 520 and the lower sleeve 540 is configured to encompass a region where the rolling lobe is formed. Alternatively, the upper sleeve 520 may be configured to encompass the region where the rolling lobe is formed.

In the present disclosure, the sleeve 500 may be manufactured to be divided into a first sleeve encompassing the region where the rolling lobe is formed, and a second sleeve not encompassing the area. With this configuration, it is possible to improve a degree of freedom of design of the sleeve 500 and enhance manufacturing efficiency of the sleeve 500 while satisfying high rigidity required for the sleeve 500.

For example, the upper sleeve 520 and the lower sleeve 540 may be made of the same material. Further, the second sleeve not encompassing the region where the rolling lobe is formed, may be made of a material having a higher rigidity than that of the first sleeve. This is because that the material having the higher rigidity may not be suitable for forming the rolling lobe.

Further, the upper sleeve 520 and the lower sleeve 540 may be manufactured with a thermoplastic elastomer (TPE) material by injection molding.

Like in a general plastic material, the thermoplastic elastomer material may be molded and reused by injection, extrusion blow molding, or the like, and has an elastomeric property.

According to an example embodiment of the present disclosure, the upper sleeve 520 and the lower sleeve 540 may be manufactured independently of each other with the thermoplastic elastomer material by the injection molding, which improves a degree of freedom of design of each of the upper sleeve 520 and the lower sleeve 540. For example, the first sleeve encompassing the region where the rolling lobe is formed, may be designed to have superiorities in rigidity and spring property by changing a thickness of the first sleeve in a longitudinal direction, which will be described later.

In addition, the flow of the injection molding of the sleeve 500 may also be improved. The sleeve 500 according to an example embodiment of the present disclosure may be designed to have different inner diameters in the longitudinal direction. This causes deterioration in the flow of the injection molding when the injection molding is performed to form a single sleeve, which makes it difficult to manage the quality of the sleeve. In the present disclosure, since the sleeve 500 is manufactured to be divided into the upper sleeve 520 and the lower sleeve 540, it is possible to improve the flow of the injection molding.

According to an example embodiment of the present disclosure, the lower circumferential portion 524 of the upper sleeve 520 and the upper circumferential portion 542 of the lower sleeve 540 are welded to each other such that the lower circumferential portion 524 of the upper sleeve 520 is attached to the upper circumferential portion 542 of the lower sleeve 540.

For example, the lower circumferential portion 524 of the upper sleeve 520 may be attached to the upper circumferential portion 542 of the lower sleeve 540 by positioning the upper sleeve 520 and the lower sleeve 540 (a butt joint) such that an end of the lower circumferential portion 524 of the upper sleeve 520 and an end of the upper circumferential portion 542 of the lower sleeve 540 face each other, and by welding such mutually-facing portions of the upper sleeve 520 and the lower sleeve 540 to each other.

More preferably, according to an example embodiment of the present disclosure, as illustrated in FIG. 3, the lower circumferential portion 524 of the upper sleeve 520 and the upper circumferential portion 542 of the lower sleeve 540 may be arranged to overlap each other. By welding such an overlapping region, the lower circumferential portion 524 of the upper sleeve 520 may be attached to the upper circumferential portion 542 of the lower sleeve 540.

Further, in order to support the welding, a stepped portion may be formed along a circumferential direction in one of the lower circumferential portion 524 of the upper sleeve 520 and the upper circumferential portion 542 of the lower sleeve 540 such that the upper sleeve 520 (or the lower sleeve 540) is seated on the lower sleeve 540 (or the upper sleeve 520). As an example, in FIG. 3, a stepped portion 546 is illustrated as being formed in the lower circumferential portion 524 of the upper sleeve 520 along the circumferential direction.

Further, according to an example embodiment of the present disclosure, the upper sleeve 520 and the lower sleeve 540 may be bonded to each other in the overlapping region by laser welding. That is, the lower circumferential portion 524 of the upper sleeve 520 and the upper circumferential portion 542 of the lower sleeve 540 may be bonded to each other by laser welding along the circumferential direction. To support this, as an example, the sleeve arranged inwardly may be made of a laser-energy absorbable material, and the sleeve arranged outwardly may be made of a laser-energy transmissible material. The sleeve arranged inwardly may include a carbon black as an example of a laser-energy absorbable material.

Further, according to an example embodiment of the present disclosure, the lower circumferential portion 524 of the upper sleeve 520 and the upper circumferential portion 542 of the lower sleeve 540 may have outwardly-extending flanges, respectively.

The flanges may be arranged to face each other and be in contact with each other. By welding the flanges, the lower circumferential portion 524 of the upper sleeve 520 may be attached to the upper circumferential portion 542 of the lower sleeve 540.

Figure 4:
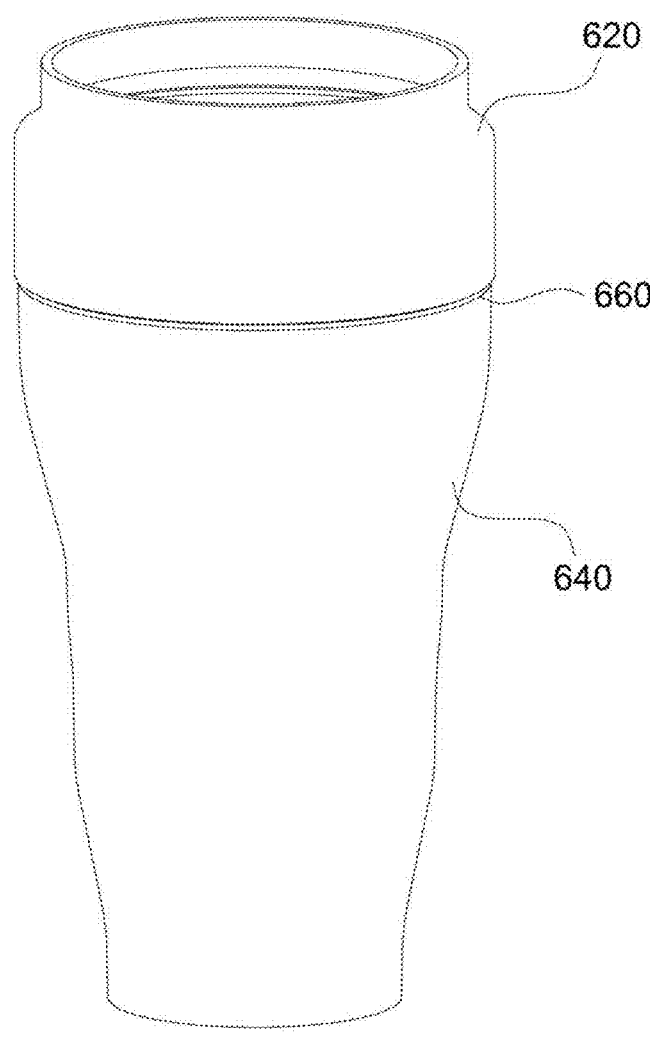
FIG. 4 is a perspective view of a sleeve according to another example embodiment of the present disclosure.
Figure 5:
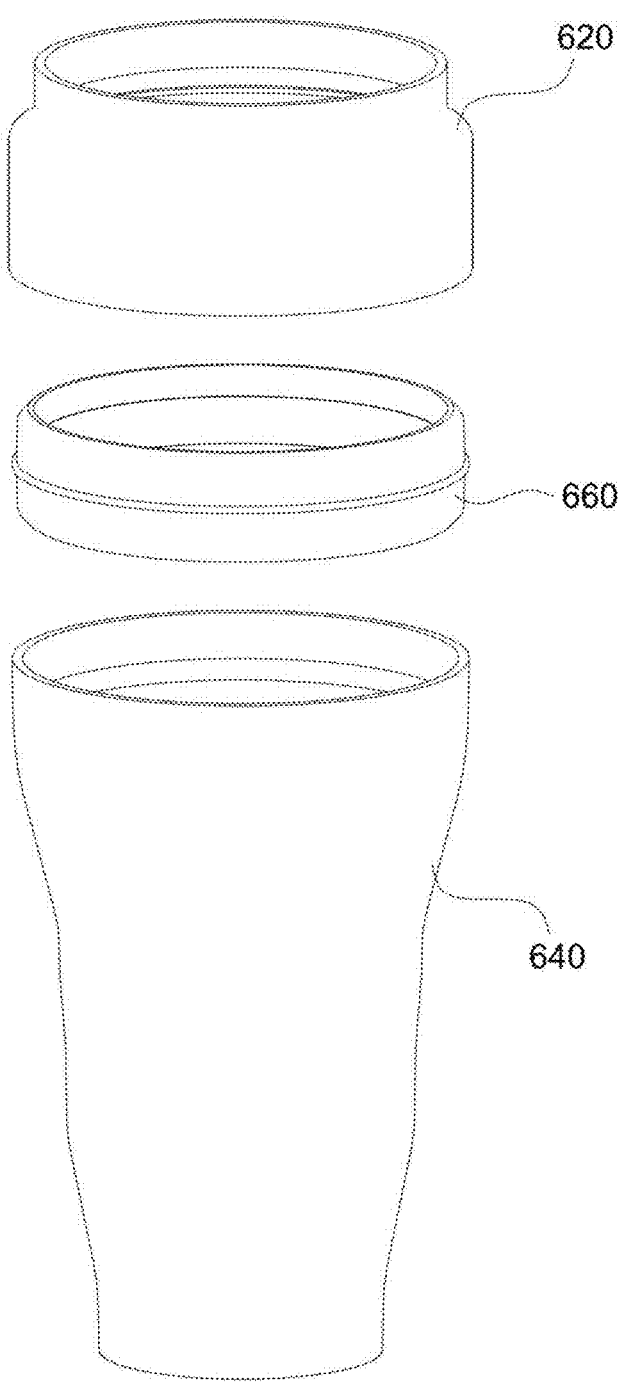
FIG. 5 is an exploded perspective view of the sleeve illustrated in FIG. 4.
Figure 6:
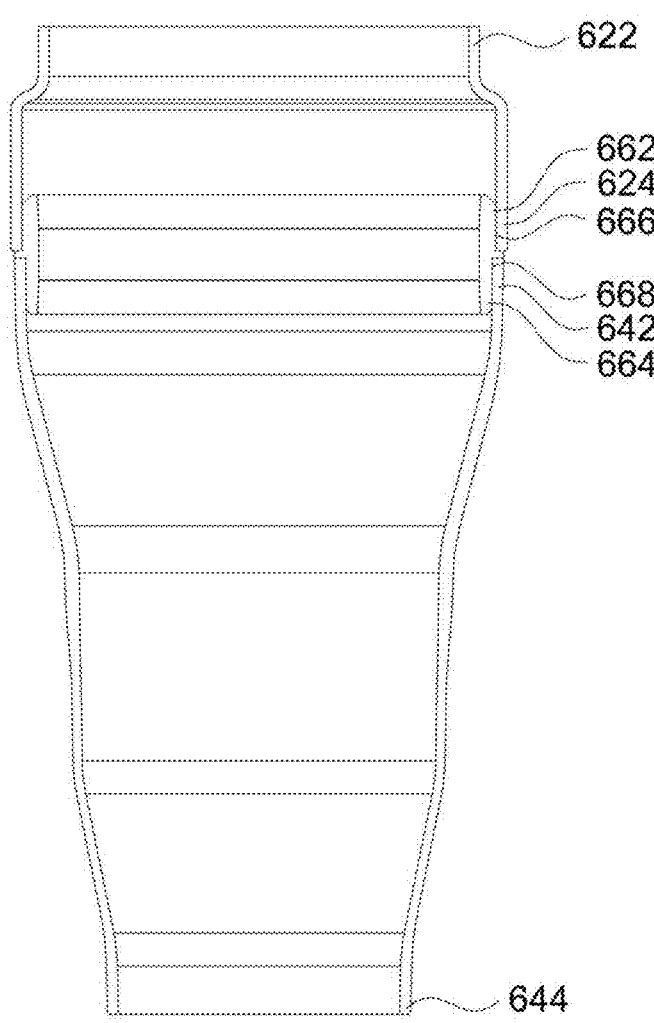
FIG. 6 is a cross-sectional view of the sleeve illustrated in FIG. 4.

FIG. 4 is a perspective view of a sleeve according to another example embodiment of the present disclosure. FIG. 5 is an exploded perspective view of the sleeve illustrated in FIG. 4. FIG. 6 is a cross-sectional view of the sleeve illustrated in FIG. 4.

Referring to FIGS. 4 to 6, a sleeve 600 according to an example embodiment of the present disclosure may further include an intermediate sleeve 660 interposed between an upper sleeve 620 and a lower sleeve 640. A lower circumferential portion 624 of the upper sleeve 620 may be coupled to an upper circumferential portion 662 of the intermediate sleeve 660, and a lower circumferential portion 664 of the intermediate sleeve 660 may be coupled to an upper circumferential portion 642 of the lower sleeve 640. A lower circumferential portion 644 of the lower sleeve 640 may be coupled to a piston portion. An upper circumferential portion 622 of the upper sleeve 620 may be coupled to the top mount.

As an example, the lower circumferential portion 624 of the upper sleeve 620 and the upper circumferential portion 662 of the intermediate sleeve 660 are welded such that the lower circumferential portion 624 of the upper sleeve 620 is attached to the upper circumferential portion 662 of the intermediate sleeve 660. The lower circumferential portion 664 of the intermediate sleeve 660 and the upper circumferential portion 642 of the lower sleeve 640 are welded such that the lower circumferential portion 664 of the intermediate sleeve 660 may be attached to the upper circumferential portion 642 of the lower sleeve 640.

For example, the lower circumferential portion 624 of the upper sleeve 620 may be attached to the upper circumferential portion 662 of the intermediate sleeve 660 by positioning such that an end of the lower circumferential portion 624 of the upper sleeve 620 and an end of the upper circumferential portion 662 of the intermediate sleeve 660 face each other, and by welding the upper sleeve 620 and the intermediate sleeve 660 in mutually-facing portions.

With this configuration, a degree of freedom in design of the sleeve 600 of the present disclosure may be further improved. For example, the upper sleeve 620 and the lower sleeve 640 may be manufactured independently of each other with different materials. In a structure in which the upper sleeve 620 and the lower sleeve 640 are bonded to each other, a degree of freedom of material selection may be limited for bonding. Meanwhile, in a case where the intermediate sleeve 660 is interposed between the upper sleeve 620 and the lower sleeve 640, even if a material that is not easy to bond the upper sleeve 620 and the lower sleeve 640 is selected, the upper sleeve 620 and the lower sleeve 640 may be easily bonded to each other by the intermediate sleeve 660.

More preferably, according to an example embodiment of the present disclosure, as illustrated in FIG. 6, the lower circumferential portion 624 of the upper sleeve 620 and an upper circumferential portion 662 of the intermediate sleeve 660 may be arranged to overlap each other, and the lower circumferential portion 664 of the intermediate sleeve 660 and the upper circumferential portion 642 of the lower sleeve 640 may be arranged to overlap each other. In this case, a stepped portion 666 may be further formed along the circumferential direction in one of the upper circumferential portion 662 of the intermediate sleeve 660 and the lower circumferential portion 624 of the upper sleeve 620 such that the intermediate sleeve 660 (or the upper sleeve 620) is seated on the upper sleeve 620 (or the intermediate sleeve 660). A stepped portion 668 may be further formed along the circumferential direction in one of the lower circumferential portion 664 of the intermediate sleeve 660 and the upper circumferential portion 642 of the lower sleeve 640 such that the intermediate sleeve 660 (or the lower sleeve 640) is seated on the lower sleeve 640 (or the intermediate sleeve 660). In FIG. 6, as an example, the stepped portions 666 and 668 are illustrating as being formed on the upper circumferential portion 662 of the intermediate sleeve 660 and the lower circumferential portion 664 of the intermediate sleeve 660

The lower circumferential portion 624 of the upper sleeve 620 and the upper circumferential portion 662 of the intermediate sleeve 660 are arranged to overlap each other. By welding such a mutually-overlapping region, the lower circumferential portion 624 of the upper sleeve 620 is attached to the upper circumferential portion 662 of the intermediate sleeve 660. Similarly, the lower circumferential portion 664 of the intermediate sleeve 660 and the upper circumferential portion 642 of the lower sleeve 640 are arranged to overlap each other. By welding such mutually-overlapping regions, the lower circumferential portion 664 of the intermediate sleeve 660 may be attached to the upper circumferential portion 642 of the lower sleeve 640. As an example, in FIG. 6, the intermediate sleeve 660 is arranged inward in the overlapping region, and the upper sleeve 620 and the lower sleeve 640 are arranged outward in the overlapping region. In such an arrangement structure, in a case where the intermediate sleeve 660 and the upper sleeve 620 or the lower sleeve 640 are welded by laser, the intermediate sleeve 660 may be made of a laser-energy absorbable material (for example, carbon black), and the upper sleeve 620 and the lower sleeve 640 may be made of a laser-energy transmissible material.

Further, according to an example embodiment of the present disclosure, the lower circumferential portion 624 of the upper sleeve 620 and the upper circumferential portion 662 of the intermediate sleeve 660 may be configured to have outwardly-extending flanges, respectively. By arranging the flanges to face each other and be in contact with each other and by welding the flanges, the lower circumferential portion 624 of the upper sleeve 620 may be attached to the upper circumferential portion 662 of the intermediate sleeve 660.

Similarly, the lower circumferential portion 664 of the intermediate sleeve 660 and the upper circumferential portion 642 of the lower sleeve 640 may be configured to have outwardly-extending flanges, respectively. By arranging the flanges to face each other and be in contact with each other and by welding the flanges, the lower circumferential portion 664 of the intermediate sleeve 660 may be attached to the upper circumferential portion 642 of the lower sleeve 640.

Figure 7:
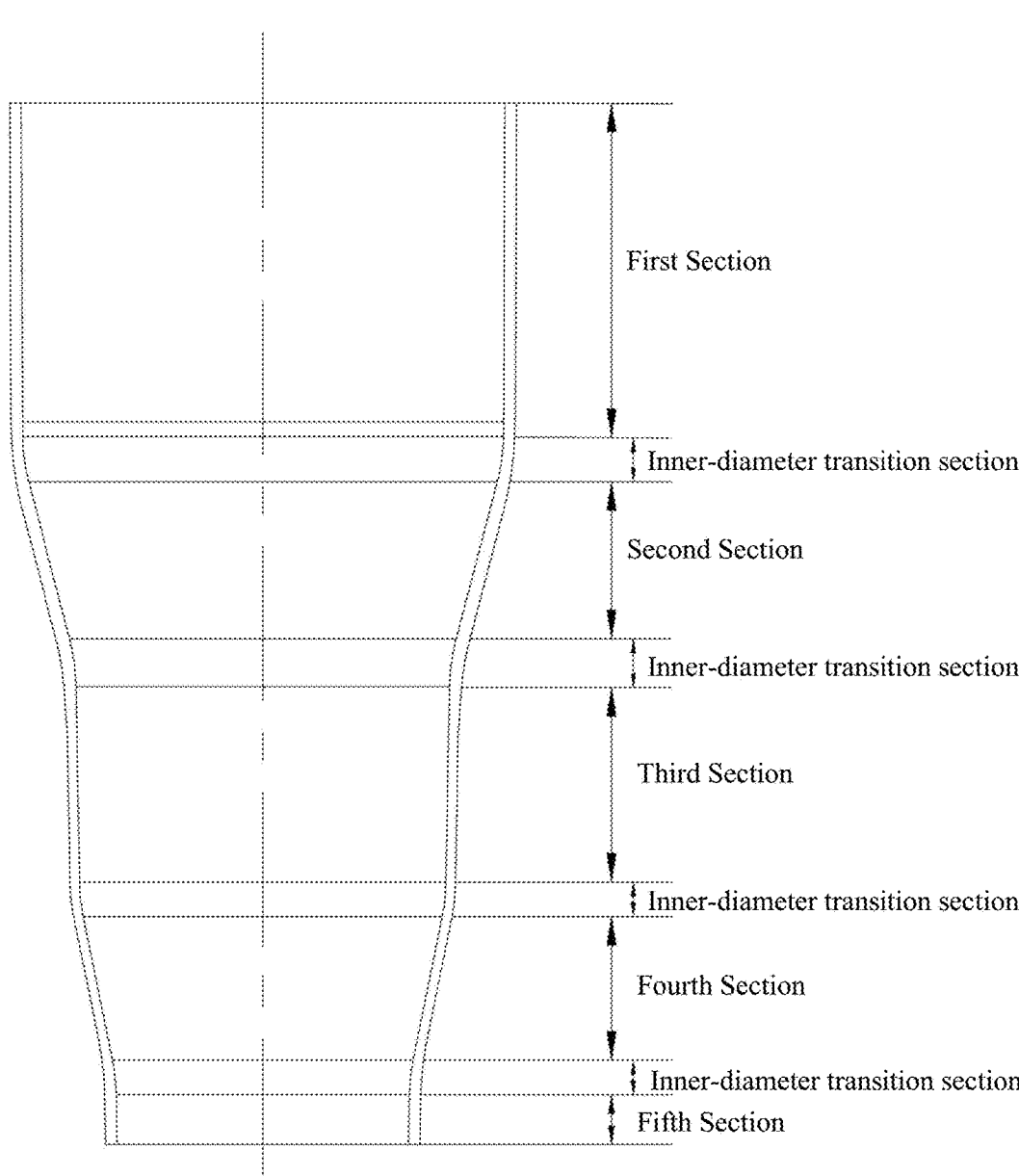
FIG. 7 is a cross-sectional view of a lower sleeve, which explains a change in thickness of the lower sleeve along a longitudinal direction.

FIG. 7 is a cross-sectional view of the lower sleeve, which explains a change in thickness of the lower sleeve along a longitudinal direction of the lower sleeve. A configuration of the lower sleeve as illustrated in FIG. 7 may be applied to both the sleeve constituted with the upper sleeve and the lower sleeve of FIG. 1, and the sleeve constituted with the upper sleeve, the intermediate sleeve and the lower sleeve of FIG. 4. Further, although a change in thickness of the lower sleeve will be mainly described later, such a change in thickness may be applied to the upper sleeve.

The sleeve (in particular, the lower sleeve) according to the present disclosure functions as an air bag whose volume may vary with up and down movement of the piston portion. That is, the volume of the sleeve, which has a constant internal pressure, varies with the up and down movement of the piston portion. With the variation in the volume, the internal pressure also varies.

For example, when the piston portion is raised at a maximum (in a full jounce), the sleeve may have a minimum volume so that the internal pressure of the sleeve is increased. This increases load to be applied to a region where a rolling lobe is formed. Meanwhile, when the piston portion is lowered at a maximum (in a full rebound), the sleeve may have a maximum volume so that the internal pressure thereof is decreased. This reduces reduce the load to be applied to the region where the rolling lobe is formed.

Further, the sleeve needs to have rigidity for durability, but also requires spring property.

In order to satisfy both the durability and the spring property, the lower sleeves (540, 640) according to an example embodiment of the present disclosure may be formed to have different thicknesses for each section along the longitudinal direction.

As an example, a thickness of the sleeve in the region where the rolling love is formed when the piston portion is raised at a maximum may be greater than a thickness of the sleeve in the region where the rolling rob is formed when the piston portion is lowered at a maximum. Further, the thickness of the sleeve in the region where the rolling rob is formed when the piston portion is raised at a maximum may be greater than a thickness of the sleeve in the region where the rolling rob is formed when a vehicle is stopped in a drivable state (when the vehicle is at a normal position).

Accordingly, the durability of the sleeve may be improved by increasing a thickness the sleeve in a region to which a relatively large load is applied. Further, the spring property of the air spring may be ensured by decreasing a thickness of the sleeve in a region to which a relatively small load is applied.

According to an example embodiment of the present disclosure, when the piston portion is raised at a maximum, the lower sleeve (540, 640) may be formed to have a maximum thickness in the region in which the rolling lobe is formed. As an example, the maximum thickness may be in a range of 3.0 to 7.0 mm.

Further, according to an example embodiment of the present disclosure, when the vehicle is stopped in a drivable state, the lower sleeve (540, 640) may be formed to have a minimum thickness in the region where the rolling rob is formed. Further, when the piston portion is lowered at a maximum, the lower sleeve (540, 640) may be formed to have the minimum thickness in the region where the rolling rob is formed. In order to further enhance the spring property, the lower sleeve (540, 640) may be formed to have the minimum thickness in both the region where the rolling rob is formed when the piston portion is lowered at a maximum and the region where the rolling rob is formed when the vehicle is stopped in a drivable state. As an example, the minimum thickness may be in a range of 1.0 to 4.0 mm.

According to an example embodiment of the present disclosure, as described above, the lower circumferential portion 524 of the upper sleeve 520 and the upper circumferential portion 542 of the lower sleeve 540 may be arranged to overlap each other. A laser welding may be performed with respect to an overlapping region where the lower circumferential portion 524 of the upper sleeve 520 and the upper circumferential portion 542 of the lower sleeve 540 are arranged to overlap each other, so that the lower circumferential portion 524 and the upper circumferential portion 542 are attached to each other.

Upon reference to the foregoing, in the present disclosure, the thickness of the upper sleeve 520 and the thickness of the lower sleeve 540 in the overlapping region may be constant in the longitudinal direction. During laser welding, energy of the same intensity needs to be applied to the overlapping region. In the case where the thickness varies in the longitudinal direction, such energy of the same intensity is unlikely to be applied and welding conditions also become complicated. As an example, the overlapping region may have a size of 5 millimeter (mm) or more in the longitudinal direction.

In the overlapping region, the thickness of the upper sleeve 520 and the thickness of the lower sleeve 540 may be identical to each other. Further, the thickness of the sleeve arranged inwardly in the overlapping region may be greater than that of the sleeve arranged outwardly in the overlapping region.

In an example in which the above-described configuration is applied, as illustrated in FIG. 7, the lower sleeve (540, 640) may be configured to have a first section in which an inner diameter is constant in the longitudinal direction, a second section in which the inner diameter decreases constantly downward in the longitudinal direction, a third section in which the inner diameter is constant in the longitudinal direction, a fourth section in which the inner diameter decreases constantly downward in the longitudinal direction, and a fifth section in which the inner diameter is constant in the longitudinal direction, which are sequentially defined from above to below. Further, inner-diameter transition sections connecting may be formed to connect between the respective sections described above.

In the first section, the thickness of the sleeve is substantially constant in the longitudinal direction. This thickness may be, for example, about 3 mm. The second section may have the region where the rolling lobe is formed when the piston portion is raised at a maximum. A thickness of the second section may be at a maximum, for example, about 3.5 mm.

Each of the third section, the fourth section and the inner-diameter transition section which connects the third section and the fourth section, may have a region in which the rolling lobe is formed when the piston portion is lowered at a maximum, and a region in which the rolling lobe is formed when the vehicle is stopped in a drivable state. A thickness of each of the third section, the fourth section, the inner-diameter transition section which connects the third section and the fourth section, may be about 2.5 mm at a minimum.

EXPLANATION OF REFERENCE NUMERALS

500, 600: Sleeve
520: Upper sleeve
540: Lower sleeve
660: Intermediate sleeve
What is claimed is:
1. A sleeve (500) for an air spring for a vehicle, comprising:
  at least an upper sleeve (520) and a lower sleeve (540) directly attached to the upper sleeve (520),
  wherein an upper circumferential portion (522) of the upper sleeve (520) is coupled to a top mount,
  wherein a lower circumferential portion (544) of the lower sleeve (540) is coupled to a piston portion, and wherein one of the upper sleeve (520) and the lower sleeve (540) is formed to have different thicknesses in a region where a rolling robe is formed for each section along a longitudinal direction.

2. The sleeve for the air spring for a vehicle of claim 1, wherein a thickness of the sleeve in a region where the rolling lobe is formed when the piston portion is raised at a maximum is greater than a thickness of the sleeve in the region where the rolling lobe is formed when the piston portion is lowered at a maximum.

3. The sleeve for the air spring for a vehicle of claim 1, wherein a thickness of the sleeve in a region where the rolling lobe is formed when the piston portion is raised at a maximum is greater than a thickness of the sleeve in the region where the rolling lobe is formed when the vehicle is stopped in a drivable state.

4. The sleeve for the air spring for a vehicle of claim 1, wherein a lower circumferential portion (524) of the upper sleeve (520) and an upper circumferential portion (542) of the lower sleeve (540) are arranged to overlap each other, and wherein, in an overlapping region where the lower circumferential portion (524) of the upper sleeve (520) and the upper circumferential portion (542) of the lower sleeve (540) are arranged to overlap each other, a thickness of the upper sleeve (520) and a thickness of the lower sleeve (540) are substantially identical to each other, or the sleeve arranged inwardly in the overlapping region is greater than a thickness of the sleeve arranged outwardly in the overlapping region.

5. The sleeve for the air spring for a vehicle of claim 1, wherein the one of the upper sleeve (520) and the lower sleeve (540) formed to have the different thicknesses for each section is configured to have at least a first section in which an inner diameter is constant in the longitudinal direction and a second section in which the inner diameter decreases constantly downward in the longitudinal direction.

6. The sleeve for the air spring for a vehicle of claim 5, wherein an inner-diameter transition section is provided between the first section and the second section to connect the first section and the second section.

7. The sleeve for the air spring for a vehicle of claim 1, wherein the sleeve is formed to have the different thicknesses such that, when the piston portion is raised at the maximum, the sleeve has a maximum thickness in a region where the rolling lobe is formed.

8. The sleeve for the air spring for a vehicle of claim 1, wherein the sleeve is formed to have the different thicknesses such that, when the vehicle is stopped in a drivable state, the sleeve has a minimum thickness in a region where the rolling lobe is formed.

9. The sleeve for the air spring for a vehicle of claim 1, wherein the sleeve is formed to have the different thicknesses such that, when the piston portion is lowered at the maximum, the sleeve has a minimum thickness in a region where the rolling lobe is formed.

10. The sleeve for the air spring for a vehicle of claim 7, wherein the maximum thickness is in a range of 3.0 mm to 7.0 mm.

11. The sleeve for the air spring for a vehicle of claim 8, wherein the minimum thickness is in a range of 1.0 mm to 4.0 mm.

12. The sleeve for the air spring for a vehicle of claim 1, wherein the lower sleeve (540, 640) is formed to have the different thicknesses.

13. An air spring for a vehicle comprising:

the sleeve (500) of claim 1;

the top mount mounted on the upper circumferential portion (522) of the upper sleeve (520); and the piston portion mounted on the lower circumferential portion (544) of the lower sleeve (540).

* * * * *